US007755654B2

(12) United States Patent
Lawton et al.

(10) Patent No.: US 7,755,654 B2
(45) Date of Patent: Jul. 13, 2010

(54) PIXEL

(75) Inventors: Robert J. Lawton, Meridian, ID (US); Donald J. Fasen, Boise, ID (US); Dennis A. Abramsohn, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 860 days.

(21) Appl. No.: 11/492,595

(22) Filed: Jul. 25, 2006

(65) Prior Publication Data

US 2008/0024584 A1 Jan. 31, 2008

(51) Int. Cl.
*B41J 2/41* (2006.01)
*B41J 2/385* (2006.01)
*H04N 1/40* (2006.01)
*G03G 15/02* (2006.01)
*G03G 15/08* (2006.01)

(52) U.S. Cl. ...................... 347/112; 347/111; 358/3.02; 399/171; 399/285

(58) Field of Classification Search ................. 347/112, 347/199, 111; 358/3.02; 399/171, 285
See application file for complete search history.

(56) References Cited

U.S. PATENT DOCUMENTS 3,241,466 A * 3/1966 Clark ......................... 399/159
4,005,436 A 1/1977 Kleinknecht et al.
4,268,871 A 5/1981 Kawamura
4,366,508 A 12/1982 Crean et al.
4,448,867 A 5/1984 Ohkubo et al.
4,588,997 A 5/1986 Tuan et al.
4,620,203 A 10/1986 Nakatani et al.
4,680,646 A 7/1987 Ikeda et al.
4,739,348 A 4/1988 Ando et al.
4,783,680 A 11/1988 Maloney
4,792,860 A 12/1988 Kuehrle
4,998,146 A 3/1991 Hack
5,050,000 A 9/1991 Ng
5,109,240 A 4/1992 Engl et al.
5,148,287 A 9/1992 Kemmochi et al.
5,153,617 A * 10/1992 Salmon ...................... 347/115
5,359,433 A 10/1994 Nagase et al.
5,360,940 A * 11/1994 Hays .......................... 399/266
5,406,314 A 4/1995 Kuehnle
5,432,611 A 7/1995 Haneda et al.
5,444,470 A 8/1995 Muto et al.
5,486,927 A 1/1996 Koizumi et al.
5,592,298 A 1/1997 Caruso
5,701,564 A * 12/1997 Parker ........................ 399/285
5,812,170 A 9/1998 Kuehnle et al.
6,016,206 A 1/2000 Koide et al.
6,029,035 A * 2/2000 Akichika et al. ............ 399/237
6,031,560 A 2/2000 Wojcik et al.
6,034,703 A 3/2000 Broddin et al.
6,072,510 A 6/2000 Ogletree et al.
6,100,909 A 8/2000 Haas et al.
6,184,911 B1 2/2001 Tombs
6,250,744 B1 * 6/2001 Hiraguchi et al. ............. 347/55
6,618,065 B2 9/2003 Koga et al.
6,666,595 B2 12/2003 Phillips
6,760,051 B2 7/2004 Fujii et al.
6,806,454 B1 * 10/2004 Zemlok ................... 250/208.1
6,995,826 B2 * 2/2006 Kubo et al. ................. 349/130

* cited by examiner

*Primary Examiner*—Stephen D Meier
*Assistant Examiner*—Sarah Al-Hashimi

(57) ABSTRACT

Various embodiments and methods relating to a pixel are disclosed.

19 Claims, 4 Drawing Sheets

PIXEL

BACKGROUND

Electrographic printers may utilize differently charged pixels to form images from toner or other printing materials. Large voltages may be used to charge such pixels. Handling such large voltages may increase costs and complexity of the electrophotographic printing device.

DETAILED DESCRIPTION OF EXAMPLE EMBODIMENTS

Figure 1:
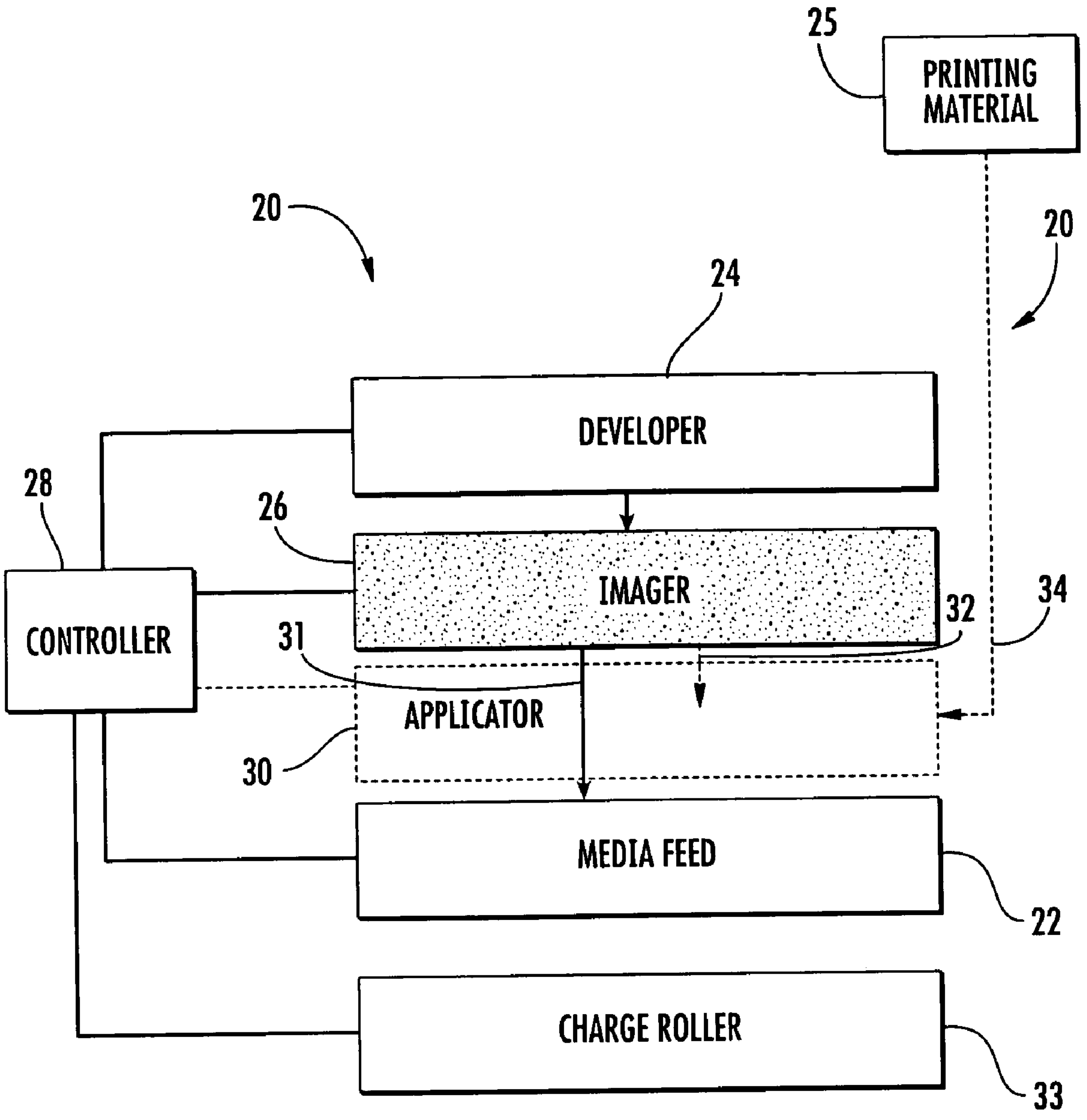
FIG. 1 is a schematic illustration of one example of an image forming apparatus according to an example embodiment.

FIG. 1 schematically illustrates one example of an image forming apparatus 20 according to one example embodiment. Image forming apparatus 20 is configured to form or print an image upon a medium, such as paper. Image forming apparatus 20 generally includes media feed 22, developer 24, imager 26 and controller 28. Media feed 22 comprises a device or mechanism configured to transfer and position media to be printed upon. Examples of media include sheets of paper, rolls of paper, transparencies, and other cellulose and non-cellulose based materials upon which an image or pattern of one or more materials are to be formed. In one embodiment, media feed 22 may include one or more of rollers, belts and the like driven by a motor or other power source. In still other embodiments, media feed 22 may be omitted where a medium is manually positioned relative to the remaining components of image forming apparatus 20.

Developer 24 comprises a device configured to be electrically charged so as to function as a counter-electrode to the electrodes provided by imager 26, wherein developer 24 and imager 26 form a capacitor providing electrostatic fields between developer 24 and imager 26. In the particular embodiment illustrated, developer 24 is also configured to supply one or more printing materials to be deposited upon media based upon the electrostatic fields. In one embodiment, developer 24 provides a supply of electrostatically charged printing material, facilitating selective deposition or transfer of the printing material to the media. In one embodiment, developer 24 supplies electrostatically charged toner. In other embodiments, developer 24 may be configured to supply other electrostatically charged printing materials. In one embodiment, developer 24 comprises a magnetic brush type developer. In other embodiments, developer 24 may comprise other development architectures such as contact developers, jump gap developers and the like.

Imager 26 comprises a device configured to cooperate with developer 24 to provide a pattern or image of varying electrostatic fields across a surface of imager 26. Imager 26 includes a surface including a two-dimensional array of pixels, such as pixels 40 and 140 shown in FIGS. 2 and 3, configured to have a voltage applied thereto and to be charged so as to cooperate with developer 24 to form differing electrostatic fields across the surface of imager 26. Based upon the voltage differential between each individual pixel 40, 140 and developer 24, the printing material, supplied by developer 24, is electrostatically attracted to or repelled from individual pixels 40, 140, on or below the surface of imager 26, based on the electrostatic field at each pixel 40, 140. As will be described with respect to FIGS. 2 and 3 hereafter, pixels 40 (shown in FIG. 2) or pixels 140 (shown in FIG. 3) of imager 26 form electrostatic fields of at least 12 volts per micrometer resulting from an applied voltage differential between the pixels and developer 24 of less than or equal to about 150 volts and nominally less than or equal to about 135 volts. As a result, circuitry for charging such individual pixels may be more compact, may provide imager 26 with greater resolution, and may be less expensive.

In one embodiment, imager 26 may constitute a drum or roller having a surface including such pixels. In another embodiment, imager 26 may constitute a belt having a surface including such pixels. The drum or belt of imager 26 may be driven by a motor or other torque source (not shown).

Controller 28 comprises a processing unit configured to generate control signals directing the selective charging (or discharging) of the pixels of imager 26 to form the pattern or image upon the surface of imager 26 or to form a portion of the final pattern to be developed upon the surface of imager 26. For purposes of this disclosure, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 28 is not limited to any specific combination of hardware circuitry and software, nor to any particular source for the instructions executed by the processing unit. In the particular embodiment illustrated, controller 28 generates control signals directing the operation of media feed 22, developer 24 and imager 26. In other embodiments, controller 28 may generate control signals directing the operation of imager 26 alone.

In operation, controller 28 generates control signals selectively charging or discharging the pixels along the surface of imager 26 in the desired pattern. Controller 28 further generates control signals directing a voltage source (not shown) to appropriately charge developer 24 such that electrostatic fields are created between developer 24 and imager 26. Based upon the pattern of electrostatic fields formed along the surface of imager 26, printing material, such as toner, supplied by developer 24 transfers to the surface of imager 26. In one embodiment, the printing material provided by developer 24 is electrostatically charged. Based upon the electrostatic field between developer 24 and the individual pixels on the surface of imager 26, the printing material is selectively attracted or repelled from portions of imager 26. For example, in one embodiment, the toner or other printing material may have a positive polarity or charge. In such an embodiment, voltage source 70 (shown in FIG. 2) may be configured to provide a voltage having a positive polarity, wherein the printing material will be attracted to the more negatively charged areas. In another embodiment, the toner or other printing material may have a negative polarity or charge. In such an embodiment, voltage source 70 may be configured to provide a voltage having a negative polarity, wherein the printing material will be attracted to the more positively charged areas. For example, developer 24 may be charged to a first negative voltage (i.e. −300 V) while a particular pixel is charged to a second lesser negative voltage (i.e. −50 V) with the printing material comprising toner having a negative charge. In such an instance, because the toner is negatively charged, the toner is attracted to a more positive charge, i.e. the pixel. In yet another instance, the developer may be charged to a first negative voltage while a particular pixel is charged to a second greater negative voltage such that negatively charged toner is repelled from the particular pixel. In forming the image of printing material upon imager 26, controller 28 may generate control signals to vary the voltage differential between developer 24 and imager 26 to vary the strength of the electrostatic field and to vary the degree to which a printing material or toner is attracted to or repelled from individual pixels. In such a manner, the darkness of the image developed on the pixel may be controlled.

Once the printing material has been selectively deposited and retained along the surface of imager 26, controller 28 generates control signals directing media feed 22 to move or transport a medium relative to imager 26. At the same time, controller 28 generates control signals directing imager 26 to rotate or move relative to the medium such that the printing material is deposited and applied to the medium carried by media feed 22 as indicated by arrow 31. In one embodiment, image forming apparatus 20 may additionally include a charge roller 33 on an opposite side of the media being printed upon to imager 26. In such an embodiment, the charge roller 33 is charged to a more positive or less negative voltage as compared to the charge of pixels 40 (shown in FIG. 2) of imager 26 to transfer the negatively charged printing material or toner to the media being moved between imager 26 and the charge roller 33 by media feed 22. In other embodiments, the charge polarity may be reversed. In other embodiments, charge roller 33 may be omitted.

As shown in phantom, in another embodiment, image forming apparatus 20 may additionally include an applicator 30. In lieu of printing material upon the surface of imager 26 being directly transferred to media carried by media feed 22, applicator 30 is utilized to transfer such printing material to media carried by media feed 22. For example, in one embodiment, applicator 30 may constitute an intermediate belt or drum having a surface upon which the printing material is transferred from imager 26 in the desired pattern or image as indicated by arrow 32, wherein applicator 30 is itself driven by a motor or other power source not shown in response to control signals from controller 28 to further transfer the printing material to the medium carried by media feed 22.

In still another embodiment, applicator 30 may constitute a drum or belt having an electrically non-conductive surface, wherein the pixels along the surface of imager 26 are charged and are moved relative to the electrically non-conductive surface of applicator 30 so as to selectively charge distinct portions of the surface of applicator 30 to distinct electrostatic charges. As indicated by arrow 34, in such an alternative embodiment, printing material may be supplied to applicator 30 rather than to imager 26 by an alternative source 25 of printing material other than developer 24. Based upon the pattern of differently charged portions created by imager 26 along the surface of applicator 30, the printing material is attracted or repelled from selected portions of applicator 30. Thereafter, the printing material is directly transferred from applicator 30 to media carried by media feed 22. In such an embodiment, imager 26 may constitute a stationary structure or bar including a plurality of rows of pixels (such as pixels 40 of FIG. 2) that are selectively charged or discharged, wherein applicator 30 is rotated or otherwise moved relative to the stationary imager 26.

Figure 2:
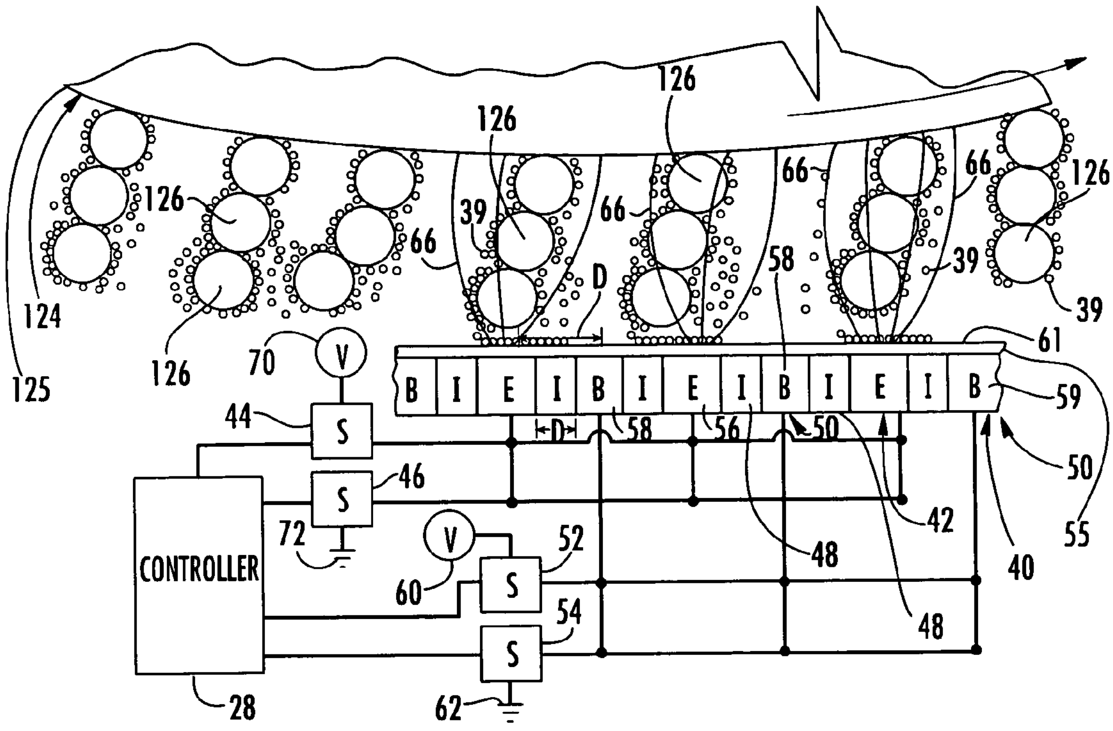
FIG. 2 is a schematic illustration of one embodiment of a pixel of an imager of the image forming apparatus of FIG. 1 according to an example embodiment.

FIG. 2 schematically illustrates development of toner particles 39 upon a single pixel 40 by developer 124. Developer 124 (schematically shown) comprises a magnetic brush type developer having a charge sleeve or cylinder 125 and a multitude of magnetic beads 126. Cylinder 125 comprises a structure configured to be electrically charged so as to serve as a counter electrode to pixel 40. Beads 126 comprise spheres or other structures of magnetic material that form chains extending from cylinder 125 and that have surfaces to which toner particles 39 adhere. In other embodiments, developer 124 may alternative comprise other developer architectures such as contact and jump gap architectures.

Pixel 40 (schematically illustrated) is one of an array of pixels along a surface of imager 26 (shown in FIG. 1). As shown by FIG. 2, pixel 40 generally includes electrode 42, electrode switches 44, 46, insulator 48, bias element 50, bias switches 52, 54 and cover layer 55. Electrode 42 comprises one or more layers of electrically conductive material configured to be electrically charged to create an electrostatic field 66 (schematically represented) with developer 124. Electrode 42 includes a plurality of portions 56 which are spaced from one another by insulator 48 and bias element 50 Electrode portions 56 of electrode 42 are electrically connected to one another so as to be at a single voltage.

Electrode switches 44 and 46 constitute electrical switching devices configured to selectively charge and discharge electrode 42, respectively. Switch 44 selectively connects electrode 42 to a voltage source 70 in response to control signals from controller 28. Switch 46 selectively connects electrode 42 to ground 72 in response to control signals from controller 28. By generating control signals to selectively charge electrode 42 via switch 44 or to selectively discharge electrode 42 via switch 46, controller 28 may control a strength and polarity of electrostatic field 66 to control a degree or extent to which toner is attracted to or repelled from the surface area of pixel 40 or the surface area of applicator 30 (shown in FIG. 1) that is charged by pixel 40.

In one embodiment, switches 44 and 46 may include thin film transistors. In yet other embodiments, switches 44 and 46 may include two-point switching devices such as diodes. In still other embodiments, other switching devices may be employed.

In the particular embodiment illustrated, switches 44 and 46 are provided proximate to pixel 40 as part of imager 26. As a result, imager 26 (shown in FIG. 1) includes an active matrix of such switches 44 and 46 to selectively charge and discharge each electrode 42. In other embodiments, switches 44 and 46 may be provided as part of a passive pixel control arrangement, wherein switches 44 and 46 of each pixel 40 of imager 26 (shown in FIG. 1) are associated with one another distant from electrode 42 and potentially distant from imager 26.

Insulator 48 comprises one or more layers of dielectric material arranged between portions 56 of electrode 42 to electrically insulate electrode 42 from bias element 50 and to space portions 56 of electrode 42 from one another. In one embodiment, insulator 48 may comprise tetraethoxysilane (TEOS). In other embodiments, insulator 48 may comprise other dielectric materials or combinations of dielectric materials.

Bias element 50 comprises an electrically conductive member interdigitated with electrode 42. In the particular example shown in FIG. 2, bias element 50 includes a plurality of spaced bias portions 58 and perimeter portions 59. In one embodiment each of bias portions 58 are electrically connected to one another within pixel 40. Bias portions 58 are interdigitated or interspersed amongst portions 56 of electrode 42 and are electrically insulated from electrode portions 56 by insulator 48. As a result, some electrode portions 56 are located outwardly beyond bias portions 58 and outwardly beyond portions of insulator 48 such that the total area of pixel 40 is greater than the total or sum of the individual areas of electrode portions 56 of electrode 42. In particular, pixel 40 has a surface area defined or bounded by outermost or perimeter electrode portions 56. As a result, pixel 40 has a ratio of the pixel to electrode area (PEA) greater than 1, enabling an electric field 66 strong enough for toner development between pixel 40 and developer 124 with a lower applied voltage differential than would be needed for a PEA of 1.0. Consequently, electrode 42 may be charged with a lesser voltage without substantially reducing the strength of electrostatic field 66 and the resulting transfer of toner particles to the surface of pixel 40. Alternatively, electrode 42 may have the same voltage applied to it, wherein the increased PEA ratio results in the strength of electrostatic field 66 being greater, increasing transfer of toner particles to pixel 40.

In one embodiment, the ratio of the pixel to electrode area (PEA) is at least about 5. In yet another embodiment, the PEA ratio is at least about 100. In still another embodiment, the PEA ratio is at least about 200. In one embodiment, the PEA is such that electrostatic field 66 has a strength of at least about 12 volts per micrometer at a distance one-half of toner diameter above the surface of pixel 40. In one embodiment, electrostatic field 66 strength is at least 12 volts per micrometer and is formed with a voltage differential between pixel 40 and developer sleeve 125 of less than or equal to about 135 volts. In still another embodiment, electrode 42 has a PEA ratio such that electrostatic field 66 has a strength of at least about 12 volts per micrometer that is formed with a voltage differential between pixel 40 and developer sleeve 125 of less than or equal to about 90 volts.

In one embodiment in which imager 26 (shown in FIG. 1) applies printing material including a toner having a mean diameter, electrode portions 56 are spaced from adjacent bias portions 58 by a center-to-center distance D less than or equal to about one-half the mean toner diameter. As a result, toner particles are more consistently and uniformly deposited across the area corresponding to pixel 40. In one embodiment, electrode portions 56 are spaced from adjacent bias portions 58 by a center-to-center spacing or distance D of less than or equal to about 2.5 microns. In other embodiments, electrode portions 56 and bias portions 58 may have a greater or lesser center-to-center spacing depending upon such factors as the mean diameter of the toner particles supplied by developer 24 (shown in FIG. 1) and the desired optical density.

In addition to increasing the PEA to increase the electrostatic field strength for a given voltage differential between electrode 42 and developer sleeve 125, bias element 50 further shields the surface of pixel 40 from fields resulting from switching the electric current being transmitted through electrically conductive lines or traces to electrode 42. By reducing such fields, background development of toner about pixel 40 is reduced or prevented.

In other embodiments, bias element 50 may extend opposite to and across each of portions 56 of electrode 42. In such an embodiment, each of bias portions 58 of bias element 50 of imager 26 (shown in FIG. 1) are electrically connected to bias portions 58 of other pixels 40 such that each of bias portions 58 of bias element 50 of each of pixels 40 of imager 26 are at a single voltage. As a result, a single pair of switches may be used to control the voltage applied to bias element 50 of all of pixels 40 of imager 26. The single pair of switches may be located distant from the array of pixels 40, enabling the array of pixels 40 to be more compact and reducing cost and complexity of imager 26.

Perimeter portions 59 of bias element 50 constitute areas of electrically conductive material or materials extending between consecutive pixels 40. As will be described hereafter, perimeter portions 59 of bias element 50 are configured to be electrically charged to an appropriate voltage to control electrostatic field boundaries between consecutive pixels 40. As a result, the sharpness of the edges or boundaries of toner between consecutive pixels 40 may also be adjusted.

Bias switches 52 and 54 constitute switching devices configured to facilitate selective charging and discharging of bias element 50, respectively. Switching device 52 selectively connects bias element 50 to a voltage source 60 in response to control signals from controller 28. Switch 54 selectively connects bias element 50 to ground 62 in response to control signals from controller 28. In one embodiment, switches 52 and 54 may constitute transistors. In yet other embodiments, switches 52 and 54 may alternatively constitute 2-point switching devices such as diodes and the like. In other embodiments, switches 52 and 54 may constitute other devices configured to selectively transmit charge.

Cover layer 55 comprises one or more layers of dielectric material overlying bias element 50 and overlying portions 56 of electrode 42. Layer 55 serves as an insulative and encapsulating layer protecting bias element 50 and electrode 42 from contamination leading to electrical breakdown. In one embodiment, layer 55 may include TEOS. In other embodiments, cover layer 55 may be formed from other materials. In one embodiment, layer 55 has a thickness of at least about 500 Angstroms, no greater than 1000 Angstroms, and nominally about 750 Angstroms. In still other embodiments, layer 55 may be omitted.

In operation, controller 28 forms an electrostatic pattern or image upon a surface of imager 26 (shown in FIG. 1) by appropriately charging or discharging each pixel 40 of imager 26. For example, in one embodiment wherein an area of an image corresponding to the particular pixel 40 shown in FIG. 2 is to not include printing material, controller 28 generates control signals which are transmitted to switches 44 and 46 such that electrode 42 is at a voltage sufficiently close to the voltage of developer 124 so that the electrostatic field 66 is nonexistent or is sufficiently weak to prevent or at least substantially reduce transfer of toner particles from developer 124 towards the particular pixel 40. For example, in one embodiment, developer 124 may be charged to −300 V. At the same time, electrode 42 of pixel 40 may be charged to −300 V. Because electrode 42 and developer 124 are at substantially similar voltages, any electrostatic field 66 there between will be insufficient to transfer toner particles to electrode 42 of pixel 40. As a result, the image area corresponding to pixel 40 will substantially lack deposited toner.

In yet another embodiment, controller 28 may generate control signals which are transmitted to switches 44 and 46 such that electrode 42 is at a voltage sufficiently distinct from the voltage of developer 124 and at an appropriate polarity such that pixel 40 repels transfer of toner particles. For example, developer 124 may be charged to −300 V while electrode 42 of pixel 40 is charged to a larger negative voltage than −300 V (i.e. −350V). Because the toner particles are negatively charged, the toner particles are repelled by the more negative electrode 42 of pixel 40.

In yet another embodiment in which the image area corresponding to the particular pixel 40 shown in FIG. 2 is to be covered with toner, controller 28 generates control signals which are communicated to switches 44 and 46 causing electrode 42 to be charged to a voltage sufficiently distinct from the voltage of developer 124 and at an appropriate polarity such that electrostatic field is sufficiently strong and in an appropriate direction so as to transfer toner particles from developer 124 towards the particular pixel 40. For example, in one embodiment, developer 124 may be charged to −300 V. At the same time, electrode 42 of pixel 40 may be charged to −50 V. Because the toner particles are negatively charged, the toner particles are attracted to the more positive electrode 42 of pixel 40.

In operation, controller 28 further generates control signals to control the sharpness or softness of an image pixel corresponding to a particular pixel 40 of imager 26. In particular, controller 28 generates control signals which are transmitted to bias switches 52, 54 so as to charge portions 58 and 59 of bias element 50 to appropriate voltages with respect to the voltage of developer 124 to either increase or decrease the focus of electrostatic field 66. For example, controller 28 may generate control signals directing switches 52, 54 to apply a negative voltage greater than a negative voltage of developer 124. This applied voltage to bias element 50 results in bias element 50 producing an electric field which physically narrows electrostatic field 66. The increased density or intensity of electrostatic field 66 results in a sharper transition from developed to non-developed areas. The electrostatic field produced by perimeter portions 59 of bias element compresses the electrostatic field 66 along the perimeter of pixel 40 and those electrostatic fields 66 along the opposing edges or boundaries of consecutive pixels 40. This sharpens the boundaries or edges between such developed and non-developed pixels. Alternatively, controller 28 may generate control signals causing a voltage to be applied to bias element 50 such that the electrostatic fields 66 are less focused and are less compressed which therefore softens the transition from areas of development to areas of non-development.

In particular embodiments, controller 28 may generate control signals increasing or decreasing the difference between the voltage of electrode 42 and the voltage of bias element 50 to increase or decrease the degree to which toner is attracted to the area corresponding to pixel 40 and to increase or decrease the darkness of the particular image pixel formed by imager pixel 40 of imager 26 (shown in FIG. 1).

Figure 3:
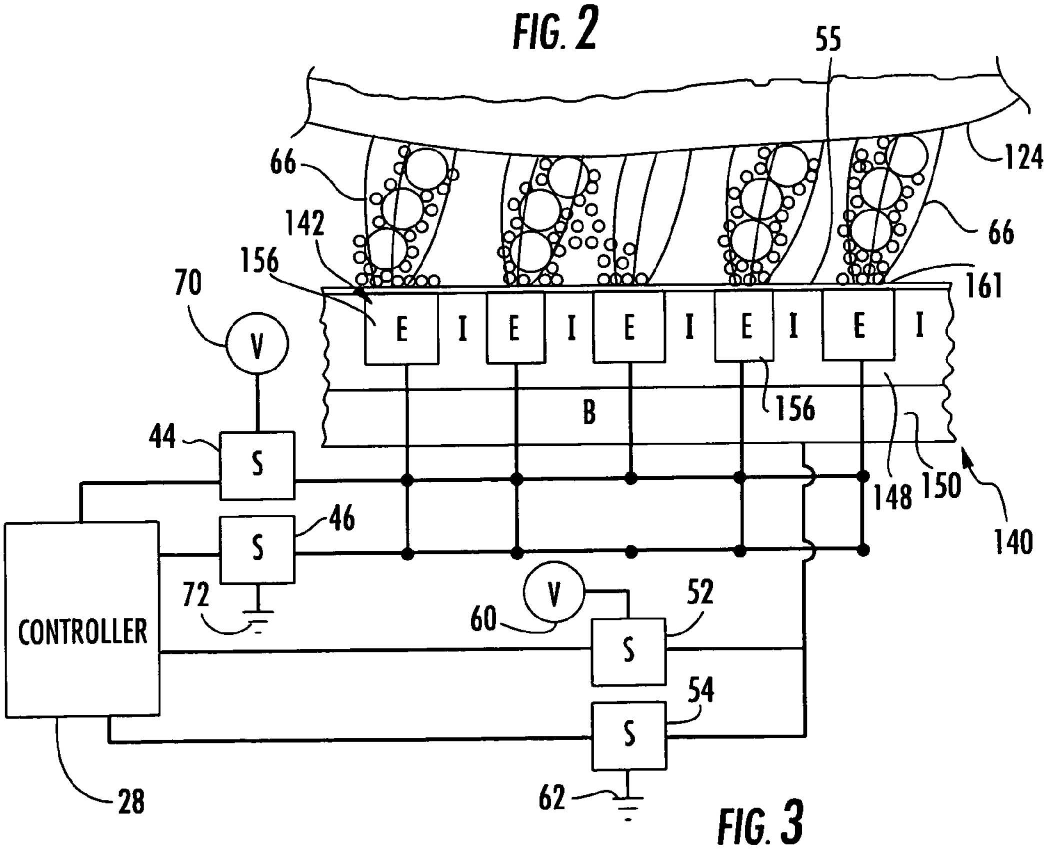
FIG. 3 is another embodiment of the pixel of FIG. 2 according to an example embodiment.

FIG. 3 schematically illustrates pixel 140, another embodiment of pixel 40. Like pixel 40, pixel 140 is one of many pixels 140 which form a two-dimensional array of pixels across the surface of imager 26 (shown in FIG. 1). Pixel 140 is similar to pixel 40 except that pixel 140 includes electrode 142, insulator 148 and bias element 150, in lieu of electrode 42, insulator 48 and bias element 50, respectively. Those remaining elements of pixel 140 which correspond to elements of pixel 40 are numbered similarly.

Electrode 142 comprises one or more layers of electrically conductive material along surface 161 of electrode 142. As shown by FIG. 3, electrode 142 includes a plurality of portions 156 spaced by insulator 148. Although portions 156 are in electrical connection with one another so as to be at the same voltage, each of portions 156 is spaced from one another such that electrode 142 does not continuously extend across the surface 161 of pixel 140. The surface area of pixel 140 to which toner may adhere is generally bounded or defined by outer or perimeter most portions 156 of electrode 142.

Insulator 148 comprises one or more layers of dielectric material extending between electrode 142 and bias element 150. Insulator 148 is further interdigitated or interleaved between electrode portions 156 to space portions 156 from one another along the surface of pixel 140. Because insulator 148 spaces electrode portions and electrode portions 156 do not continuously extend along surface 161 of electrode 142, electrode 142 has a PEA ratio greater than 1. In other words, the total surface area of pixel 140 exceeds a total surface area of electrode portions 158. As a result, stronger electrostatic fields may be created along surface 161 with the same or smaller voltage difference between pixel 140 and developer 124.

Bias element 150 comprises one or more layers of electrically conductive material extending in a plane beneath electrode 142. Bias element 150 is similar to bias element 50 (shown in FIG. 2) except that bias element 150 continually extends beneath and across each of portions 156 of electrode 142, with electrode 142 being positioned between bias element 150 and a surface 161 of electrode 142. As with bias element 50 (shown in FIG. 1), controller 28 generates control signals controlling the voltage applied to bias element 150 to control or adjust the focus of electrostatic fields 66 between developer 124 and each of portions 156 of electrode 142. In addition, controller 28 may generate control signals causing appropriate voltages to be applied to bias element 150 such that bias element 150 forms electrostatic fields between consecutive pixels 140 to compress or contain the electrostatic fields 66 formed by perimeter most portions of electrode 142 to either sharpen or soften the edges or boundaries of image pixels formed by consecutive pixels 140 depending upon the relationship between the voltage applied to bias element 150 and the voltage of developer 124.

Pixel 140 operates in a similar manner to that of pixel 40 of FIG. 2. In particular, in instances where the portion of an image to be formed corresponding to pixel 140 is to be dark or to be formed by printing material deposited upon a print medium, controller 28 generates control signals causing electrode 142 to be selectively charged or discharged via switches 44 and 46, respectively such that electrode 142 is at a sufficient voltage differential with respect to developer 124, causing a sufficiently strong electric field 66 having an appropriate polarity to be formed between electrode 142 and developer 124 such that negatively charged toner is attracted to the surface area of pixel 140 or the corresponding surface of applicator 30 (shown in FIG. 1) charged by pixel 140. In addition, the amount of toner that is attracted to the surface area of pixel 140 (or applicator 30) may be controlled by controlling the strength of electrostatic field 66 by controlling the extent to which the voltage of electrode 142 differs from that of developer 24. In other embodiments controller 28 may generate control signals causing electrode 142 to be charged or discharged via switches 44 and 46, respectively, to repel such toner as desired.

In those instances where a portion of an image to be formed corresponding to the surface area of pixel 140 is not to contain printing material, such as toner, controller 28 may alternatively generate control signals charging or discharging electrode 142 via switches 44 and 46, respectively, such that electrode 142 is at a sufficiently reduced voltage differential with respect to developer 124. As a result, electrostatic field 66 will not be generated or will have minimal strength, not substantially attracting toner to the surface area of pixel 140.

Figure 4:
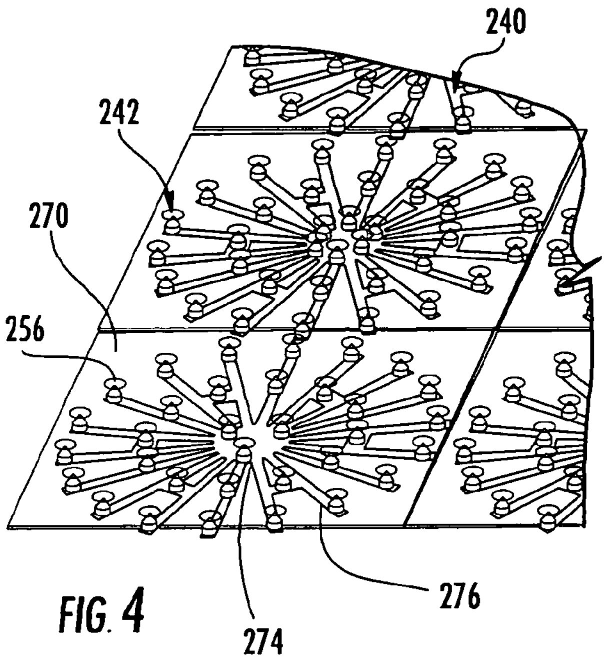
FIG. 4 is a top perspective view of a 2-dimensional array of other embodiments of the pixel of FIG. 2 according to an example embodiment.
Figure 5:
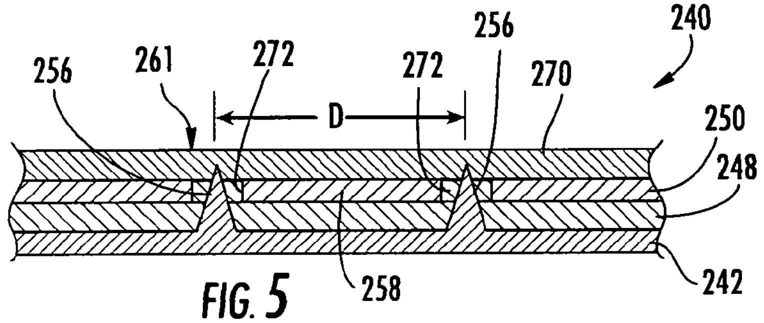
FIG. 5 is a sectional view of one of the pixels of FIG. 4 according to an example embodiment.

FIGS. 4 and 5 illustrate pixel 240, another embodiment of pixel 40. As shown by FIG. 4, pixel 240 is one of a two-dimensional array of such pixels 240 positioned side-by-side across a surface of imager 26 (shown in FIG. 1). As shown by FIG. 5, pixel 240 generally includes electrode 242, electrode switches 44, 46 (shown and described with respect to FIG. 3), insulator 248, bias element 250, bias switches 50 and 52 (shown and described with respect to FIG. 3, and cover layer 270.

Electrode 242 comprises one or more layers of electrically conductive materials electrically isolated from adjacent pixels 240. As shown in FIG. 4, in addition to portions 256, electrode 242 includes a hub 274 and outwardly or radially extending traces, leads or legs 276. Hub 274 extends at a center portion of pixel 240 and is electrically connected to switches 44 and 46 (shown in FIG. 3). Legs 276 radially extend outwardly from hub 274 and electrically connect hub 274 to portions 256. Portions 256 extend upwardly from hub 274 and upwardly from legs 276 so as to project towards surface 261 of pixel 240 through openings 272 in bias element 250. In one particular embodiment, portions 256 terminate at finite points. According to one embodiment, portions 256 have a center-to-center spacing D with respect to adjacent portions 256 of less than or equal to about one-half of a mean diameter of a toner particle of the printing material provided by developer 24 (shown in FIG. 1). As a result, a substantially continuous electric field may be provided across the surface 261 of pixel 240 such that the portion of the image to be formed upon the media corresponding to the surface area of pixel 240 may more likely be provided with a continuous coating or coverage of toner or printing material.

Insulator 248 comprises one or more layers of dielectric material electrically insulating bias element 250 from electrode 242. In the particular example illustrated, insulator 248 comprises a layer extending between electrode 242 and bias element 250. In the particular example illustrated, insulator 248 further extends between portion 256 and bias element 250 within openings 272. In one embodiment, insulator 248 may constitute TEOS. In other embodiments, insulator 248 may comprise other dielectric materials or combinations of other dielectric materials.

Bias element 250 comprises a single continuous layer of electrically conductive material having openings 272 through which portions 256 of electrode 242 project. Bias element 250 is selectively charged and discharged via switches 52 and 54 (shown and described with respect to FIG. 3) in response to control signals from controller 28 (shown in FIG. 3). In one particular embodiment, bias element 250 comprises a single continuous layer extending across multiple such pixels 240 positioned across a surface of imager 26 (shown in FIG. 1).

According to one embodiment, bias element 250 is formed from aluminum. According to one embodiment, openings 272 of bias element 250 have a minimal diameter of 2.5 micrometers, a maximum diameter of 6.0 micrometers and nominally a diameter of about 4.0 micrometers. In other embodiments, bias element 250 may be formed from other materials and may have openings 272 with alternative dimensions.

Cover layer 270 comprises one or more layers of dielectric material overlying bias element 250 and overlying portions 256. Layer 270 serves as an insulative and encapsulating layer protecting bias element 250 and portions 256 from contamination leading to electrical breakdown. In one embodiment, layer 270 may include TEOS. In other embodiments, cover layer 270 may be formed from other materials. In one embodiment, layer 270 has a thickness of at least about 500 Angstroms, no greater than 1000 Angstroms, and nominally about 750 Angstroms. In still other embodiments, layer 270 may be omitted.

Overall, because pixel 240 has a PEA ratio much greater than 1, pixel 240 may facilitate the creation of a relatively strong electrostatic field across surface 261 with a relatively lower voltage differential between electrode 242 and developer 24 (shown in FIG. 1). In one embodiment, pixel 240 has a PEA ratio of at least about 5. In one particular embodiment, pixel 240 has a PEA ratio of at least about 100 and nominally greater than or equal to about 200. In one embodiment, each portion 256 is spaced from an adjacent portion by a distance no greater than 5 microns such that pixel 240 provides an electrostatic field having a strength of at least about 12 volts per micrometer from a voltage difference between electrode 242 and developer 24 (shown in FIG. 1) of less than or equal to about 90 volts.

Figure 6:
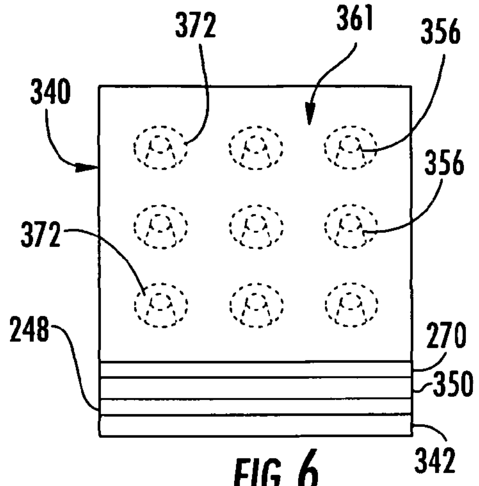
FIG. 6 is a top perspective view of another embodiment of the pixel of FIG. 2 according to an example embodiment.

Although pixel 240 is illustrated as having legs 276 radiating from hub 274 and as having portions 256 attached to legs 276, in other embodiments, pixel 240 may have electrical portions 256 in other arrangements or patterns. For example, FIG. 6 illustrates pixel 340, another embodiment of pixel 40. Pixel 340 is similar to pixel 240 except that pixel 340 includes electrode 342 and bias element 350 in lieu of electrode 242 and bias element 250, respectively. Electrode 342 is similar to electrode 242 except that electrode 342 includes electrode portions 356 in lieu of electrode portions 256. Electrode portions 356 are arranged in a matrix or grid pattern and extend through openings 372. In one particular embodiment, electrode portions 356 are spaced from one another such that electrode portions 356 have a center-to-center spacing of less than or equal to about one-half a diameter of toner supplied by developer 24 (shown in FIG. 1). In one particular embodiment, portions 356 have a center-to-center spacing of less than or equal to about 3.5 microns.

Bias element 350 is similar to bias element 250 except that bias element 350 includes openings 372 arranged in a matrix or grid pattern as compared to openings 272 which are arranged in an outwardly extending radial pattern.

Like pixel 240, pixel 340 has a PEA ratio greater than 1 and at least about 100 to facilitate the provision of relatively strong electrostatic fields across surface 361 of pixel 340 with lower voltage differentials which facilitates use of lower drive voltages for electrodes 342. For example, in one embodiment, pixel 340 is configured to provide electrostatic forces along surface 361 having a strength of at least 12 volts per micrometer from a voltage differential between electrode 342 and developer 124 (shown in FIG. 2) of less than about 90 volts. In other embodiments, portions 356 may have other arrangements and PEA ratios to provide other electrostatic field strengths with other voltage differentials.

Figure 7:
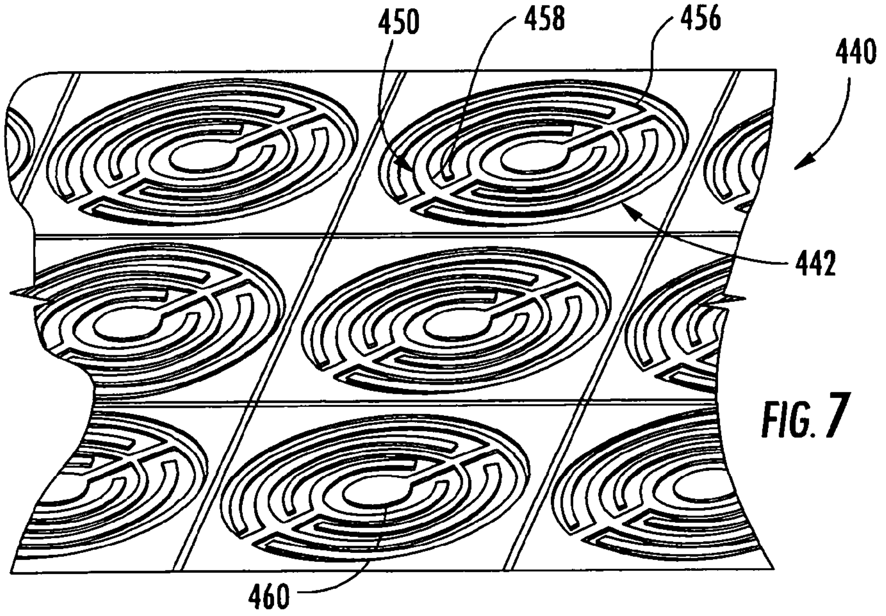
FIG. 7 is a top perspective view of a 2-dimensional array of other embodiments of the pixel of FIG. 2 according to an example embodiment.
Figure 8:
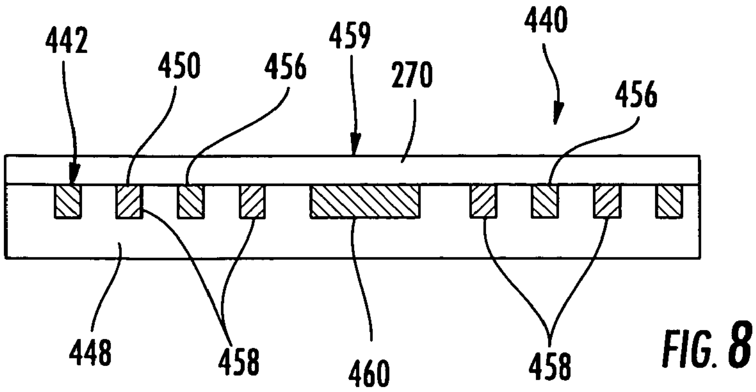
FIG. 8 is a sectional view of one of the pixels of FIG. 7 according to an example embodiment.

FIGS. 7 and 8 schematically illustrate pixel 440, another embodiment of pixel 40 shown in FIG. 2. As shown by FIG. 7, pixel 440 is one of a two-dimensional array of pixels 440 positioned side-by-side across a surface of imager 26 (shown in FIG. 1). Pixel 440 generally includes electrode 442, electrode switches 44, 46 (shown and described with respect to FIG. 2), insulator 448 bias element 450, bias switches 52, 54 (shown and described with respect to FIG. 2) and cover layer 270.

Electrode 442 comprises one or more layers of electrically conductive material providing electrode portions 456. Electrode portions 456 are spaced apart by insulator 448 and bias element 450. As a result, electrode 442 may have a PEA greater than one so as to form a stronger electrostatic field with developer 24 (shown in FIG. 1). In one embodiment, portions 456 of electrode 442 are formed from an electrically conductive material such as aluminum. In other embodiments, portions 456 may be formed from other materials.

Insulator 448 comprises one or more layers of dielectric material extending between electrode portions 456 and portions of bias element 450. In one embodiment, insulator 448 may be formed from a dielectric material such as TEOS. In other embodiments, insulator 448 may be formed from other dielectric materials.

Bias element 450 comprises one or more layers of electrically conductive material interspersed between portions 456 and electrically isolated from portions 456 of electrode 442 by insulator 448. As shown by FIG. 8, bias element 450 includes a plurality of spaced portions 458 generally planar with portions 456 of electrode 442. As with biases 50, 150, and 250, bias element 450: (1) extends between consecutive portions 456 of electrode 442 (to increase the PEA of pixel 440 to increase electrostatic field strength), (2) shields the surface of pixel 440 from electrostatic fields emanating from an electrical interconnect below the surface of pixel 440 and (3) serves to selectively focus electrostatic fields from electrode 442 to control the density of coverage of toner to the particular pixel 440 and to sharpen or soften boundaries or edges of an image formed by toner along a perimeter of pixel 440. In one embodiment, portions 458 of bias element 450 are formed from aluminum. In other embodiments, other materials may be used.

Cover layer 270 is described above with respect to pixel 240 in FIGS. 4 and 5. Cover layer 270 serves as a encapsulating layer protecting electrode portions 456 and bias portions 458 from contamination leading to electrical breakdown. In other embodiments, cover layer 270 may be omitted.

As shown by FIG. 7, according to one example embodiment, bias portions 458 may constitute concentric rings interdigitated or interleaved with electrode portions 456 also configured as concentric rings. In one embodiment, such concentric rings are radially spaced from one another by insulator 448 and have a center-to-center spacing of less than or equal to about one-quarter mean diameter of toner particles of the printing material supplied by developer 24 (shown in FIG. 1). As shown by FIG. 7, electrode 442 further includes a center-most hub portion 460. In one embodiment, the outer perimeter of hub portion 460 is spaced from the adjacent bias portion 456 by a distance of less than or equal to about one-half the mean toner diameter of printing material. In one embodiment, electrode 442 is electrically connected to switches 44 and 46 (shown in FIG. 3) via an electrical connection to hub portion 460.

As shown by both FIGS. 7 and 8, electrode portions 456 and bias portions 458 are substantially located in a single plane substantially parallel to surface 461. As a result, electrode 442 and bias element 450 of each pixel 440 may be more easily fabricated with fewer steps and at a lower cost. In other embodiments, electrode 442 and bias element 450 may alternatively extend within different planes.

Figure 9:
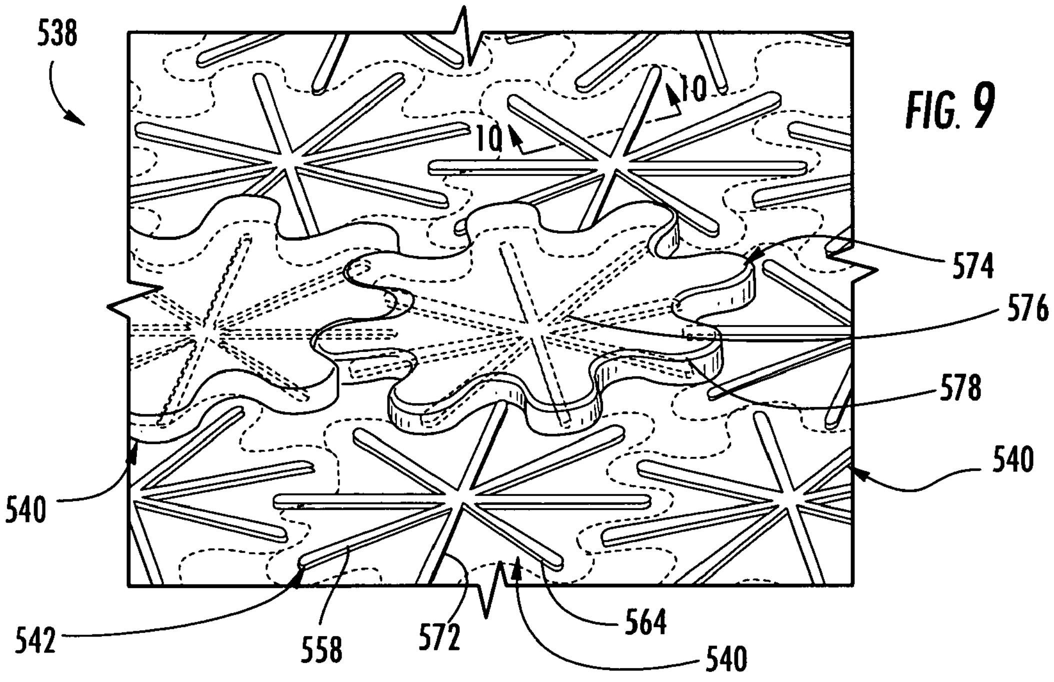
FIG. 9 is a top perspective view of a 2-dimensional array of other embodiments of the pixel of FIG. 2 according to an example embodiment.
Figure 10:
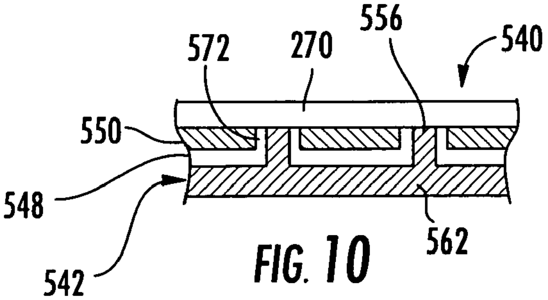
FIG. 10 is a sectional view of one of the pixels of FIG. 9 taken along line 10-10 according to an example embodiment.

FIG. 9 illustrates array 538 of pixels 540, alternative embodiments of pixel 40 shown in FIG. 2. FIG. 10 is a sectional view illustrating one of pixels 540. As shown by FIG. 9, pixels 540 extend along a surface of imager 26 (shown in FIG. 1) and provide an electric field for electrostatically attracting or repelling printing material from developer 24 or for charging a surface of applicator 30 for electrostatically attracting or repelling printing material from developer 24 (shown in FIG. 1). As shown by FIG. 10, each pixel 540 generally includes electrode 542, electrode switches 44, 46 (shown in FIG. 3), insulator 548, bias element 550, bias switches 52, 54 (shown in FIG. 2), and cover layer 270. Electrode 542, insulator 548, and bias element 550 are substantially similar to electrode 242, insulator 248, and bias element 250 of pixel 240 (shown and described with respect to FIGS. 4 and 5) except that bias element 550 includes openings 572 which continuously extend outwardly in a radial direction from a center point so as to have a star or asterisk shape and that electrode 542 includes electrode portions 556 projecting from an underlying portion 562 that project through openings 572 and that also extend radially outwardly from a center point such that electrode portions 556 of electrode 542 have a star or asterisk shape as shown in FIG. 9.

Like electrode portions 256 of electrode 242, electrode portions 556 of electrode 542 provide a development pattern 574 having a central hub portion 576 and radially extending lobes 578. Development pattern 574 is formed by the attraction or repulsion of printing material, such as toner, to either the surface of imager 26 (shown in FIG. 1) including electrodes 542 or as a result of electrodes 542 forming a pattern of electrostatic fields upon the surface of applicator 30 (shown in FIG. 1), wherein the printing material of toner forms development patterns 574 upon the surface of applicator 30. Development pattern 574, when viewed by a human eye unmagnified, appears less distinct to an observer. This type of pattern provides enhanced image quality for certain types of images such as photographs and pictures.

As further shown by FIG. 9, in the particular example illustrated, pixels 540 are sufficiently closely arranged such that tips of fingers 564 of adjacent electrodes 542 of consecutive pixels 540 are partially interleaved or interdigitated with one another. As a result, a greater mass of printing material, such as toner, may be developed between adjacent pixels 540 due in part to the overlap of the area of toner development patterns 574. An extent to which the position of the toner center of mass will shift may be in proportion to the amount of voltage applied to each pixel 540. As a result, apparent resolution of an image being formed by array 538 of pixels 540 is enhanced. Although not shown, electrode portions 246 of pixels 240 may be closely arranged in a similar manner such that outermost portions 246 of adjacent pixels 240 are interleaved or interdigitated with one another to provide similar resolution enhancement.

Figure 11:
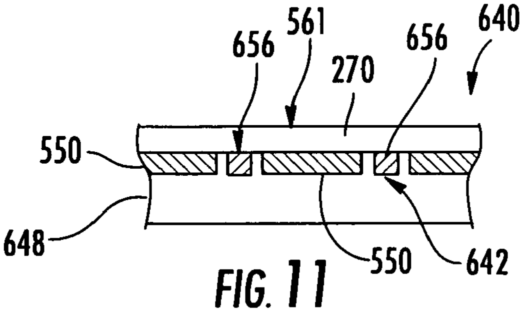
FIG. 11 is a sectional view of another embodiment of one of the pixels of FIG. 9 taken along line 10-10 according to an example embodiment.

FIG. 11 is a sectional view schematically illustrating pixel 640, another embodiment of pixel 540 shown in FIGS. 9 and 10. Pixel 640 is substantially identical to pixel 540 except that pixel 640 includes electrode 642 in lieu of electrode 542 and includes insulator 648 in lieu of insulator 548. Those remaining elements of pixel 640 which correspond to elements of pixel 540 are numbered similarly. Electrode 642 is similar to electrode 542 except that electrode 642 is substantially coplanar with bias element 550. Like electrode 542, electrode 642 includes electrode portions 556 spaced from one another and interspersed between bias portions 558 such that each pixel 640 has a PEA ratio greater than 1. As a result, pixel 640 may provide stronger electrostatic fields along surface 561 of pixel 640 lower voltage differentials between pixel 640 and developer 24 (shown in FIG. 1). Because electrode 642 omits underlying portion 562 and merely includes portions 656 which are substantially coplanar with bias element 550, bias element 550 and electrode 642 may be more easily formed in fewer steps and at a lower cost.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An image forming apparatus comprising:

individual pixels including at least one electrode and having a ratio of pixel area to electrode area greater than one, wherein each electrode includes a plurality of spaced portions and wherein the plurality of portions are spaced from one another by a center-to-center distance of between about 0.5 to 1 of a mean toner diameter.

2. The apparatus of claim 1 further comprising a bias element layer, wherein each electrode portion passes through the bias element layer.

3. The apparatus of claim 2, wherein each electrode terminates at a point.

4. The apparatus of claim 2, wherein the portions are in a radial arrangement.

5. The apparatus of claim 2, wherein the electrodes are in a matrix arrangement.

6. The apparatus of claim 1 further comprising a bias layer, wherein the electrode and the bias layer are coplanar and wherein the electrode includes spaced electrode portions and wherein the bias layer includes bias element portions interleaved between the electrode portions.

7. The apparatus of claim 6, wherein the apparatus is configured to form an image using toner and wherein the electrode portions are spaced from the bias portions by less than or equal to about one-half a mean toner diameter.

8. The apparatus of claim 6, wherein the electrode portions comprise concentric rings and wherein the bias element portions comprise concentric rings interdigitated with the electrode rings.

9. The apparatus of claim 1, wherein the electrode includes a plurality of spaced portions having a center-to-center spacing of less than or equal to about 2.5 microns.

10. The apparatus of claim 1, wherein the ratio of the pixel area to the electrode area is at least about 5.

11. The apparatus of claim 1, wherein the pixels include a first pixel and a second pixel and wherein portions of the first electrode and the second electrode are interdigitated.

12. The apparatus of claim 1, wherein individual of the pixels include electrodes and wherein the electrodes are in a concentric arrangement.

13. The apparatus of claim 1 further comprising a printing material supply, wherein the supply is configured to apply printing or display material to the pixels.

14. The apparatus of claim 1, wherein each pixel is configured to form an electrostatic field of at least about 12 volts per micrometer from a voltage differential with a developer of less than or equal to about 90 volts or a voltage differential of less than or equal to about 135 volts.

15. The apparatus of claim 1, wherein the pixels extend in a two-dimensional array and wherein the apparatus further comprises a controller configured differently charge the pixels relative to one another to form a two-dimensional image of different charges on the two-dimensional array of pixels.

16. The apparatus of claim 1, wherein the pixels extend in a two-dimensional array and are configured to carry different amounts of toner to form a two-dimensional image of toner on the two-dimensional array of pixels.

17. An image forming apparatus comprising:

individual pixels including at least one electrode and having a ratio of pixel area to electrode area greater than one; and a bias layer, wherein the electrode and the bias layer are coplanar, wherein the electrode includes spaced electrode portions, wherein the bias layer includes bias element portions interleaved between the electrode portions, wherein the apparatus is configured to form an image using toner and wherein the electrode portions are spaced from the bias portions by less than or equal to about one-half a mean toner diameter.

18. An image forming apparatus comprising:

individual pixels including at least one electrode and having a ratio of pixel area to electrode area greater than one, wherein each pixel is encircled by a plurality of other spaced pixels and is interdigitated with each of the other spaced pixels.

19. An image forming apparatus comprising:

individual pixels including at least one electrode and having a ratio of pixel area to electrode area greater than one, wherein each pixel is configured to form an electrostatic field of at least about 12 volts per micrometer from a voltage differential with a developer of less than or equal to about 90 volts or a voltage differential of less than or equal to about 135 volts.

* * * * *